United States Patent
Abd Elhamid et al.

(10) Patent No.: US 8,815,335 B2
(45) Date of Patent: Aug. 26, 2014

(54) METHOD OF COATING A SUBSTRATE WITH NANOPARTICLES INCLUDING A METAL OXIDE

(75) Inventors: Mahmoud H. Abd Elhamid, Troy, MI (US); Youssef M. Mikhail, Sterling Heights, MI (US); Gayatri Vyas Dadheech, Rochester Hills, MI (US); Curtis A. Wong, Macomb Township, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 246 days.

(21) Appl. No.: 12/727,628

(22) Filed: Mar. 19, 2010

(65) Prior Publication Data

US 2010/0247749 A1 Sep. 30, 2010

Related U.S. Application Data

(63) Continuation-in-part of application No. 12/335,650, filed on Dec. 16, 2008.

(51) Int. Cl.
*B05D 5/12* (2006.01)

(52) U.S. Cl.
USPC ............................ 427/115; 427/180; 427/212

(58) Field of Classification Search
USPC ......................... 427/115, 180, 212
See application file for complete search history.

(56) References Cited

U.S. PATENT DOCUMENTS

| | | | |
|---|---|---|---|
| 5,766,787 A * | 6/1998 | Watanabe et al. ............ | 429/494 |
| 7,029,374 B2 | 4/2006 | Chen | |
| 7,575,731 B2 | 8/2009 | Iijima et al. | |
| 7,935,381 B2 | 5/2011 | Winter et al. | |
| 2004/0255973 A1 | 12/2004 | Chen | |
| 2005/0112451 A1 | 5/2005 | Lee et al. | |
| 2005/0227135 A1 * | 10/2005 | Chalkova et al. ............ | 429/33 |
| 2006/0245998 A1 * | 11/2006 | Kahn et al. ................. | 423/592.1 |
| 2007/0003813 A1 | 1/2007 | Vyas et al. | |
| 2007/0082137 A1 | 4/2007 | Lin et al. | |
| 2007/0087120 A1 | 4/2007 | Connors, Jr. et al. | |
| 2007/0190362 A1 | 8/2007 | Weidman | |
| 2008/0118808 A1 * | 5/2008 | Tayanagi et al. ............ | 429/33 |
| 2012/0141915 A1 * | 6/2012 | Sahu et al. .................. | 429/494 |

FOREIGN PATENT DOCUMENTS

| | | |
|---|---|---|
| CN | 1964920 A | 5/2007 |
| CN | 101283470 A | 10/2008 |
| DE | 69608793 T2 | 2/2001 |
| DE | 10116198 A1 | 10/2002 |
| DE | 102006029473 A1 | 1/2007 |
| DE | 102007038174 A1 | 2/2008 |
| JP | 10-114521 A | 5/1998 |

(Continued)

OTHER PUBLICATIONS

Watanabe et al. "Self-Humidifying Polymer Electrolyte Membranes for Fuel Cells", Journal of Electrochemical Society, vol. 143, No. 12 Dec. 1996, pp. 3847-3852.*

(Continued)

*Primary Examiner* — Brian K Talbot
(74) *Attorney, Agent, or Firm* — BrooksGroup

(57) ABSTRACT

One exemplary embodiment may include a method comprising: depositing a solution comprising an organometallic compound on a substrate, drying the solution to provide a film of the organometallic compound and at least partially oxidizing an organic component of the organometallic compound to provide nanoparticles including metal oxides on the substrate which would have multiuse industrial applications.

10 Claims, 5 Drawing Sheets

(56) References Cited

FOREIGN PATENT DOCUMENTS

| JP | 2007250318 | * | 9/2007 |
|---|---|---|---|
| WO | 2011041218 A2 | | 7/2011 |

OTHER PUBLICATIONS

Uchida et al. "Self-humidifying Electrolyte Membranes for Fuel Cells—preparation of highly dispersed TiO2 particles in Nafion 112" Journal of Electrochemical Society, vol. 150, pp. A57-A62, 2003.*

Non-Final Office Action dated Aug. 18, 2011 issued in U.S. Appl. No. 12/335,650 filed Dec. 16, 2008, 12 pages.

German Office Action dated Jul. 10, 2012; Application SN: 102009057398.4; Applicant: GM Global Technology Operations LLC; 5 pages.

Chinese Office Action dated Apr. 1, 2013; Application No. 200910253487.3; Applicant: GM Global Technology Operations LLC; 9 pages.

* cited by examiner

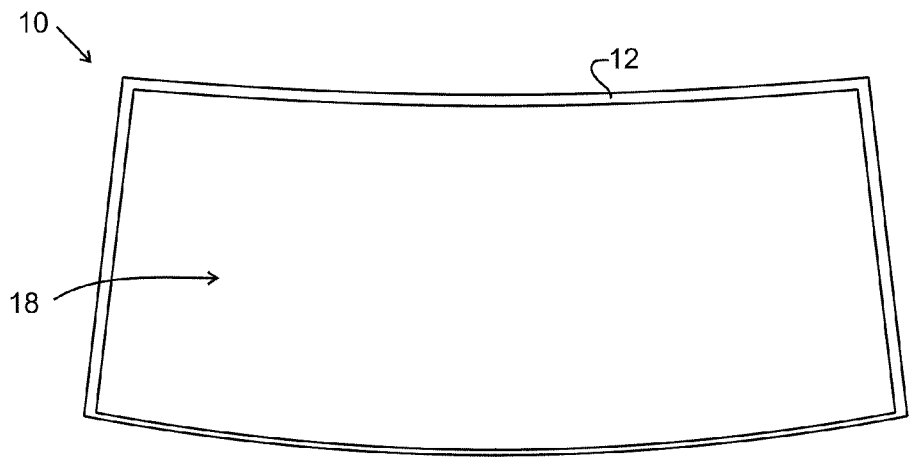
Fig. 7
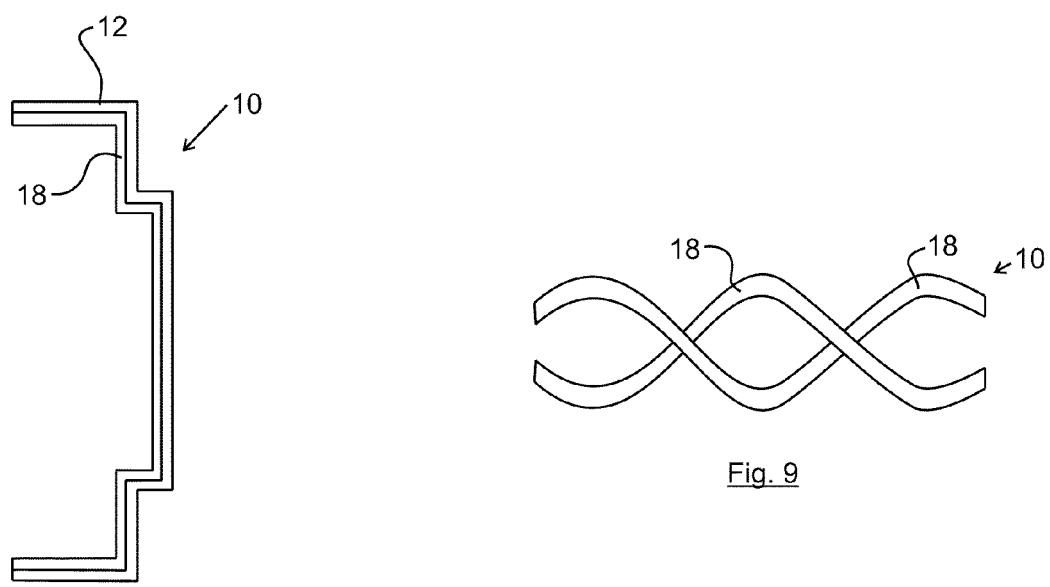
Fig. 8
Fig. 9
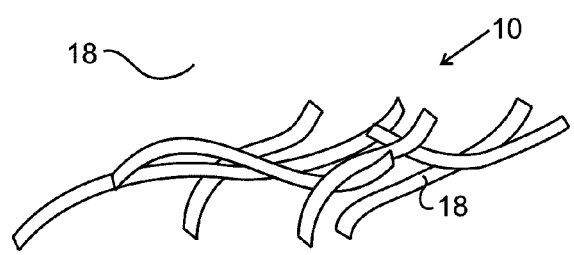
Fig. 10

US 8,815,335 B2

METHOD OF COATING A SUBSTRATE WITH NANOPARTICLES INCLUDING A METAL OXIDE

CROSS-REFERENCE TO RELATED APPLICATIONS

This application is a continuation-in-part of U.S. patent application Ser. No. 12/335,650 filed Dec. 16, 2008 and claims the benefit of the filing date thereof.

TECHNICAL FIELD

The field to which the disclosure generally relates to includes methods of making coatings including nanoparticles, and products including nanoparticles including a layer including organometallic nanoparticles or nanoparticles including a metal oxide.

BACKGROUND

Fuel cells produce energy through the electrochemical reaction between hydrogen and oxygen/air with water as an end product. Inside the fuel cells, water can accumulate inside reacting gas distribution channels formed in fuel cell bipolar plates, thereby reducing the mass transport of the reactant gases through the channels and to the catalyst layer where the electrical chemical reaction occurs. Furthermore, the accumulation of water on a variety of other substrates may also be undesirable. In addition, nanoparticles including metal oxides may have a variety of applications.

SUMMARY OF EXEMPLARY EMBODIMENTS OF THE INVENTION

One exemplary embodiment includes forming a liquid coating on a substrate, the liquid coating including a reactive organometallic compound dissolved in a non-polar solvent, drying the liquid coating to provide a film including the organometallic compound and oxidizing (decomposing).

Other exemplary embodiments of the invention will become apparent from the detailed description provided hereinafter. It should be understood that the detailed description and specific examples, while disclosing exemplary embodiments of the invention, are intended for purposes of illustration only and are not intended to limit the scope of the invention.

BRIEF DESCRIPTION OF THE DRAWINGS

Exemplary embodiments of the invention will become more fully understood from the detailed description and the accompanying drawings, wherein:

FIG. 7 illustrates a product including a layer including nanoparticles including a metal oxide formed on a surface thereof according to one exemplary embodiment of the invention.

FIG. 8 illustrates a sectional view of a housing having a layer including nanoparticles including a metal oxide deposited on a surface of the housing according to one exemplary embodiment.

FIG. 9 illustrates a plurality of metal oxide particles or rods formed by coating a porous filter paper with an organometallic compound drying, and oxidizing (decomposing) the same and burning off the filter paper according to one exemplary embodiment.

FIG. 10 illustrates a plurality of metal oxide nanoparticle rods formed by depositing a solution including an organometallic compound over a mat formed of random carbon fibers, drying the solution and oxidizing the resultant film and burning off the carbon mat to form the nanoparticle rods or any desired morphology depending on the template according to one exemplary embodiment.

DETAILED DESCRIPTION OF EXEMPLARY EMBODIMENTS

The following description of the embodiment(s) is merely exemplary (illustrative) in nature and is in no way intended to limit the invention, its application, or uses.

One exemplary embodiment of the invention includes oxidizing a material including an organometallic compound to provide nanoparticles including a metal oxide. In one embodiment, substantially all of the organic content of the organometallic compound is oxidized/decomposed leaving substantially only metal oxides. The organometallic compound may be deposited on a substrate as a solution, the solution dried to provide a film including the organometallic compound and thereafter the film including the organometallic compound is oxidized to provide nanoparticles including the metal oxide that strongly adhere to the substrate. The nanoparticles including a metal oxide may have a variety of applications. Such applications may include, but are not limited to, depositing the nanoparticles on, in or through a substrate to impart hydrophilic properties thereto, or the nanoparticles including metal oxides may be utilized as a high surface area and electrochemically stable catalyst support or as a hydrogen storage and hydrogen producing material. In one embodiment, the metal oxide may have the formula $M_xO_a$, where both x and a are greater than 0 and less than 10. The metal component (M) may be a single element or multiple elements. For example, in another embodiment, the metal oxides may have the formula $M1_xM2_yM3_zO_a$, where both x and a are greater than 0 and less than 10, and both y and z are less than or equal to 0 and less 10.

To provide hydrophilic properties and to serve as a catalyst support, the metal component of the metal oxide may include, but is not limited to, titanium, tantalum, zirconium or niobium. For hydrogen storage, the metal component of the now particle metal oxides may include, but is not limited to, at least one of titanium, tantalum, or zirconium. Hydrogen may be stored on high surface area materials produced by the process and may include nanoparticles consisting essentially of metal oxides or the organic component of the organometallic compound may only be partially oxidized, leaving a plurality of metallic oxides linked together by organic struts. The current invention can be used to make materials for hydrogen production utilizing the semiconductor properties of the high surface area nanocrystalline metal oxide. When light with a well defined wavelength is illuminated on the metal oxide, electrons from the valance band of the semiconductor oxide move from the valance band to the conduction band leaving behind positive holes which are known to be strong oxidizing agents that can be used to oxidize organic pollutants/waste. The free electrons can then be trapped on another electrode to evolve hydrogen. Thus the current materials might be used for making hydrogen while cleaning the environment from organic waste/pollutants.

Figure 1A:
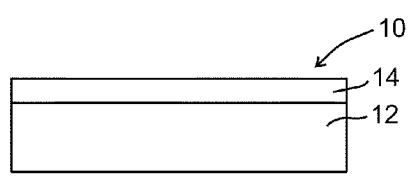
FIG. 1A illustrates a product and a method of making the same, including depositing a solution including an organometallic compound on a substrate according to one exemplary embodiment.
Figure 1B:
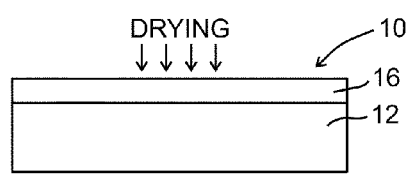
FIG. 1B illustrates a product and a method of making the same, including drying the solution deposited on the substrate of FIG. 1 to form a film of organic metallic material on the substrate according to one exemplary embodiment.
Figure 1C:
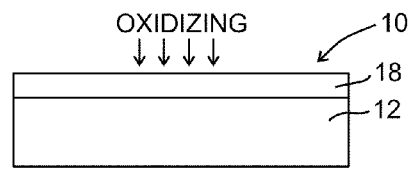
FIG. 1C illustrates a product and a method of making the same, including oxidizing (decomposing) the film on the substrate of FIG. 1B to form a layer including nanoparticles including a metal oxide according to one exemplary embodiment.

Referring now to FIG. 1A, one embodiment of the invention includes depositing an organometallic solution 14 on a substrate 12. The solution includes an organo metallic compound in a solvent which may include, but is not limited to, a non polar solvent. Thereafter, as shown in FIG. 1B, the solution 14 may be dried to provide a layer or film of the organometallic compound 16. The organometallic compound may be a single material or a variety of organometallic materials may be included wherein the organic component and/or the metallic component varies. As shown in FIG. 1C, the film or layer of organometallic compound 16 may then be oxidized/decomposed, for example, but not limited to, exposing the film to air to provide a layer of film including nanoparticles including a metallic oxide 18. If necessary or desired, additional oxidizing processes may be utilized to completely or partially oxidize the organic component or the metal component of the organometallic compound.

Figure 2:
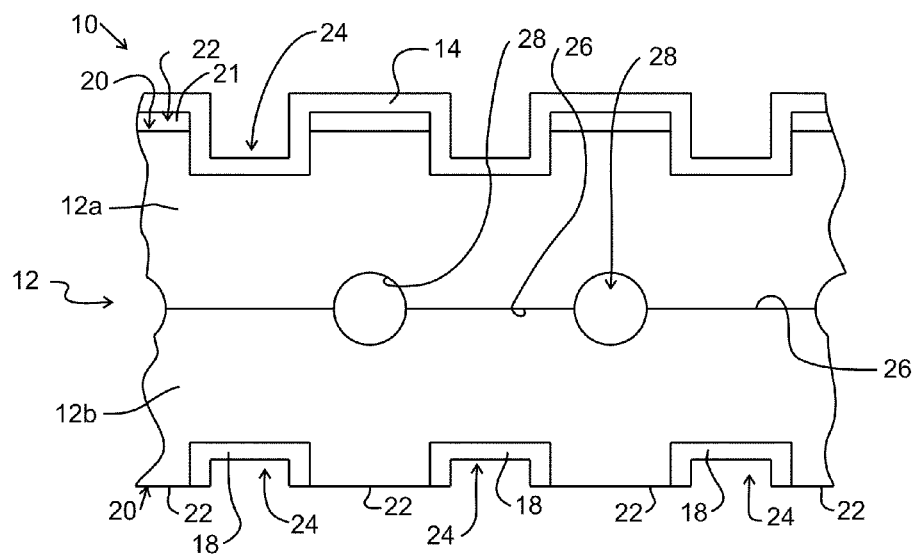
FIG. 2 illustrates a product and a method of making the same including a fuel cell bipolar plate having a layer including nanoparticles including a metal oxide selectively deposited thereon according to one exemplary embodiment.
Figure 3:
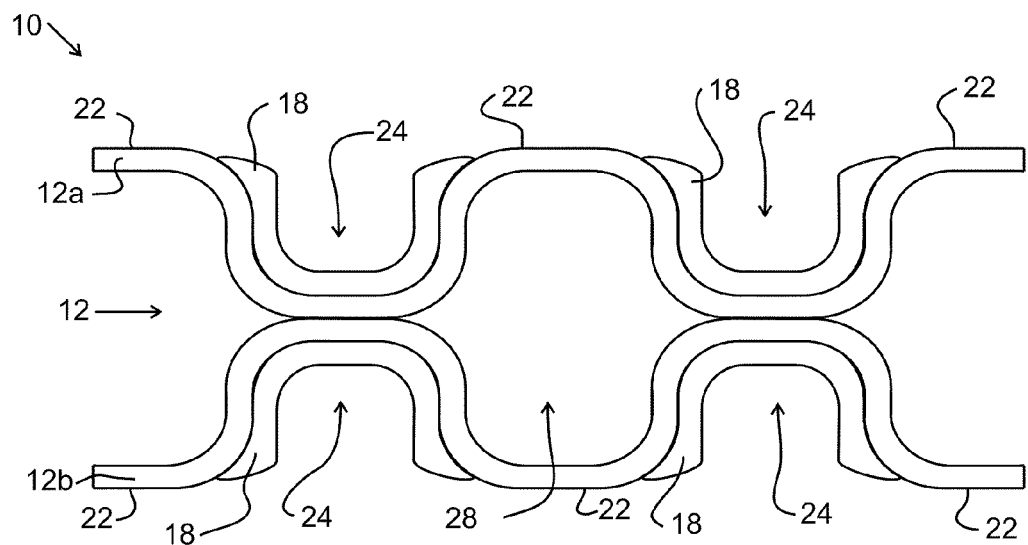
FIG. 3 illustrates an alternative embodiment of a fuel cell bipolar plate including a layer including nanoparticles including a metal oxide selectively deposited thereon according to one exemplary embodiment.

Referring now to FIG. 2, one exemplary embodiment includes providing a substrate 12 which may be a fuel cell bipolar plate which may be a single piece or may include a first piece 12a and a second piece 12b joined together. Each of the first piece 12a and second piece 12b may include a first face 20 having defined therein a reactant gas flow field including a plurality of lands 22 and channels 24 through which the reactant gases flow. A second face 26 may have defined therein at least a portion of a cooling channel 28 for flowing cooling fluid there through to cool the fuel cell. In one exemplary embodiment, a mask material 21 may be deposited on the lands, leaving the channels exposed. The organometallic solution 14 may be deposited or formed over the mask 21 and into the channels 24 as shown on piece 12a. The solution 14 may be formed or deposited or applied by dipping the bipolar plate in a solution of the bath, spraying, rolling or other suitable technique. After the solution 14 has been dried and/or oxidized, the mask 21 may be moved including the film or nanoparticles attached thereto leave a layer or film of nanoparticles including metal oxides deposited only in the channels 24. Although masking will ensure that the freshly prepared titanium oxide nanoparticles do not cover the lands and interfere with contact resistance, it is possible that the nanoparticles can be applied using nozzles that only apply the reactive organometallic only inside the channels which will decompose into the nanoparticles inside the channels leaving the lands intact Referring now to FIG. 3, another exemplary embodiment includes a fuel cell bipolar plate 12 including a first piece 12a and second piece 12b formed by stamping metal substrates, such as stainless steel.

Figure 4:
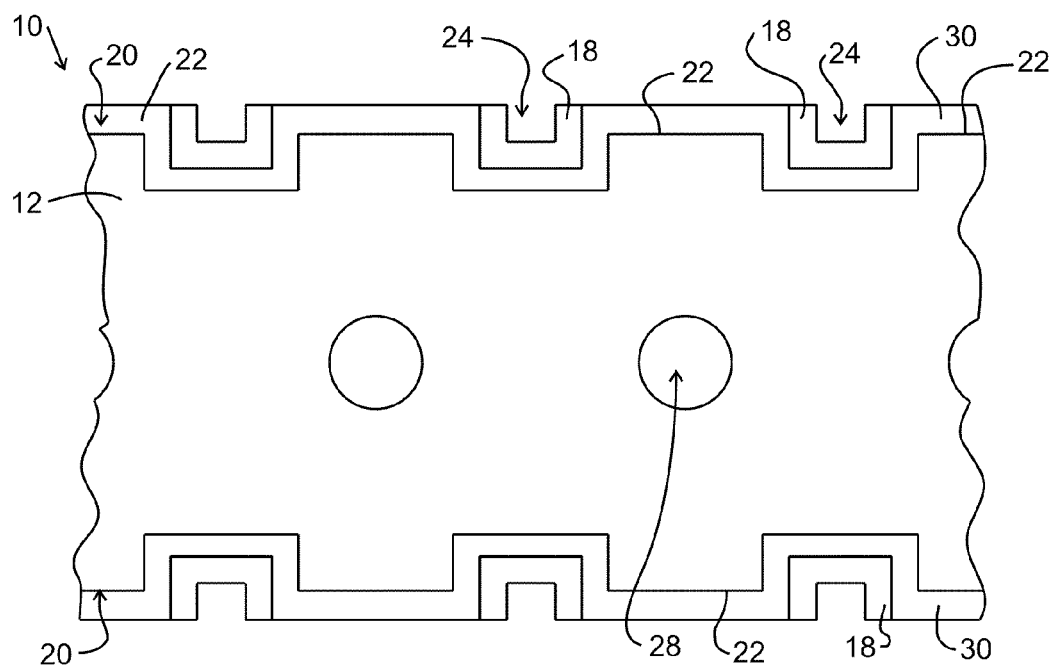
FIG. 4 illustrates another embodiment of a fuel cell bipolar plate including a low contact resistant coating deposited over a surface of the bipolar plate and a layer including nanoparticles including a metal oxide selectively deposited over portions of the low contact resistant layer according to one exemplary embodiment.

Referring now to FIG. 4, a low contact resistant material 30 such as, but not limited to, gold may be deposited over a portion or all of the first face 20, including on the lands 22 and into the surfaces forming the channel 24. The layer including nanoparticles including metal oxides 18, may be deposited over the low contact resistant material 30, but preferably only on the surfaces defining the channel 24.

Figure 5:
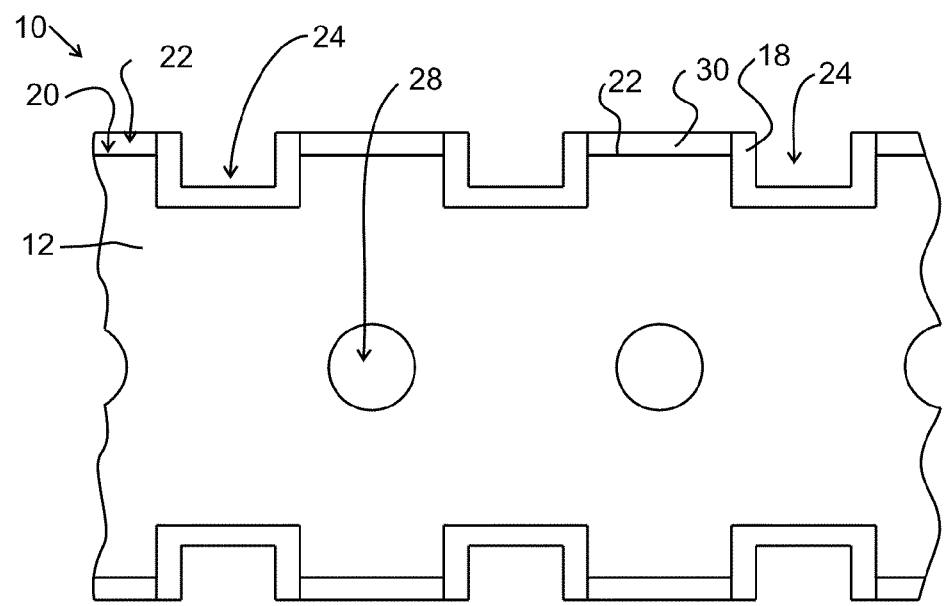
FIG. 5 illustrates a fuel cell bipolar plate including a low contact resistant material selectively deposited on lands of a fuel cell bipolar plate and a layer including nanoparticles including a metal oxide selectively deposited in the channels of the bipolar plate according to one exemplary embodiment.

Referring now to FIG. 5, another exemplary embodiment includes a fuel cell bipolar plate 12 including a low contact resistant material 30 such as, but not limited to, gold, deposited only on the lands 22 with the layer including nanoparticles including metal oxides 18 deposited only on the surfaces forming the channels 24.

Figure 6:
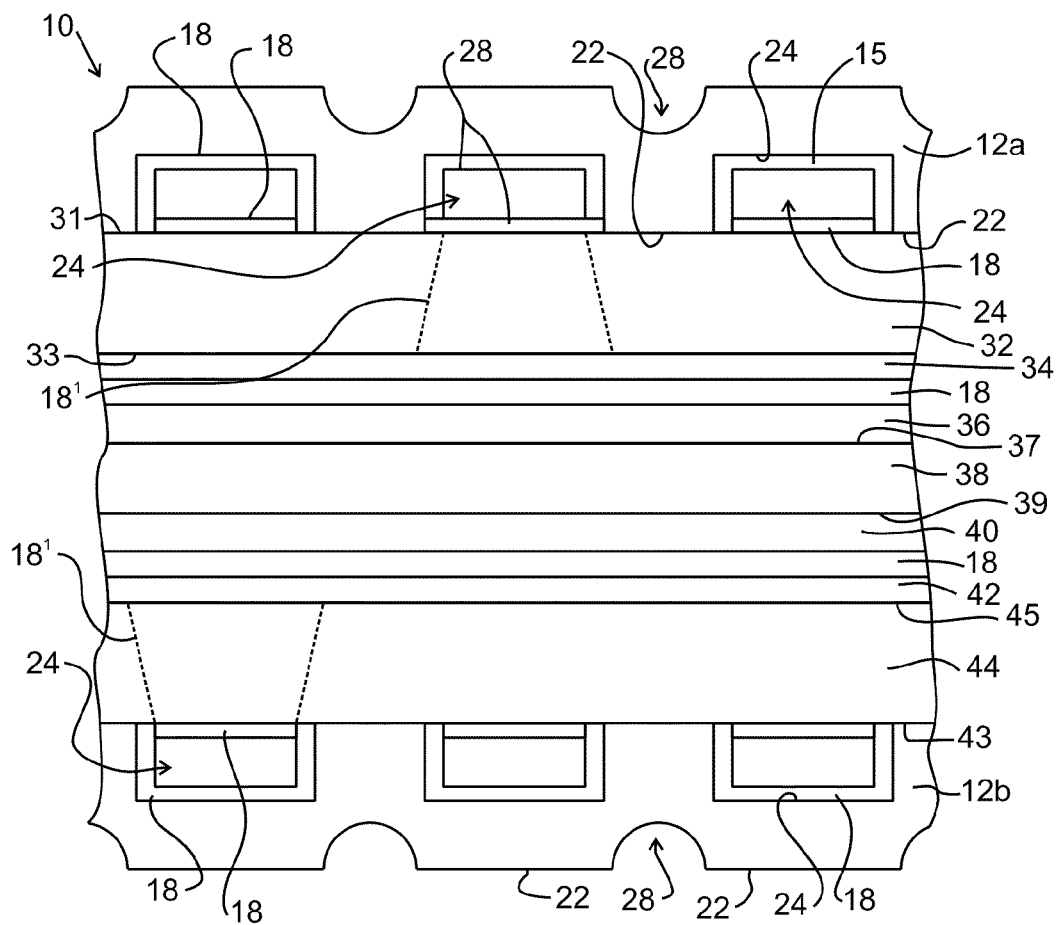
FIG. 6 is a sectional view of a portion of a fuel cell stack including a layer including nanoparticles including a metal oxide deposited over portions of one or more of fuel components in the fuel cell stack according to one exemplary embodiment.

FIG. 6 is a sectional view of a portion of a fuel cell stack including a membrane, which may be a proton exchange membrane 38 having a first phase 37 and an opposite second phase 39. A first catalyst 36 may be deposited on the first face 37 of the membrane 38 and a second catalyst 40 may be deposited on the second membrane face 39. A layer including nanoparticles including metal oxides 18 may be deposited on any of the fuel cell components completely covering a surface or selectively deposited thereon, or in or through various fuel cell components. For example, a layer including nanoparticles including metal oxides 18 may be deposited on one or both of the catalyst layers 36, 40. Alternatively, the layer including nanoparticles including metal oxides 18 may be deposited on either diffusion media layer 32, 34, or on either microporous layer 34, 42 if present on the gas diffusion media layers 32, 34. The first gas diffusion media layer 32 may include a first face 31 and an opposite second face 33. Similarly, the second gas diffusion media layer 44 may include a first face 43 and an opposite second face 45. The layer including nanoparticles including metal oxides 18 may be deposited directly on the second face 33, 45 of the first gas diffusion media layer 32 or second gas diffusion media layer 44 respectively. Yet in another embodiment, the layer 18 may be deposited on the first face 30 adjacent the bipolar plate 12a, or on the first face 43 adjacent the second bipolar plate portion 12b. In one embodiment, the layer including nanoparticles including metal oxides 18 may be deposited in a manner generally aligned with the channels 24 formed in the bipolar plate portions 12a, 12b. In yet another exemplary embodiment, the nanoparticles including metal oxides 18' may be deposited through at least portions of the body of the gas diffusion media layers 32, 44, for example, in an area underlying the channels 24 formed in the bipolar plate 12a, 12b.

Referring now to FIG. 7, in yet another exemplary embodiment, the layer including nanoparticles including metal oxides 18 may be deposited on a substrate 12 such as a glass substrate, which may be a vehicle window or windshield.

Referring now to FIG. 8, in yet another exemplary embodiment, the layer including nanoparticles including metal oxides 18 may be deposited on a surface of a housing substrate 12, such as, but not limited to, a vehicle headlamp or taillight housing cover to provide hydrophilic properties to the surface thereof and reduce condensation of water droplets. The hydrophilic nature of the nanocrystalline metal oxide may be further enhanced when illuminated by the housing light. The light produces positive holes inside the oxide that could potentially oxidize most organic contaminants render the surface of the housing less prone to air contamination.

Referring now to FIG. 9, a plurality of nanoparticles rods may be provided and may be utilized for a variety of applications, including, but not limited to, catalysts or hydrogen storage. The rods 18 may be formed in one embodiment by depositing an organometallic solution on a porous fibrous mat which may be woven. The mat may be made from a sacrificial material such as carbon which may be burnt off, etched or otherwise removed to leave the plurality of metal oxide rods 18. Similarly, as shown in FIG. 10, the plurality of rods 18 may be provided in a random form using a mat with unwoven, randomly positioned fibers, depositing the organometallic solution, drying the same and oxidizing the same. The carbon mat may be burnt off to provide the plurality of nanoparticle rods 18.

In another embodiment the solution is deposited in the pores of a porous material, dried and oxidized, and thereafter the porous material is removed to leave nanoparticles in the shape of the pores.

Figure 11:
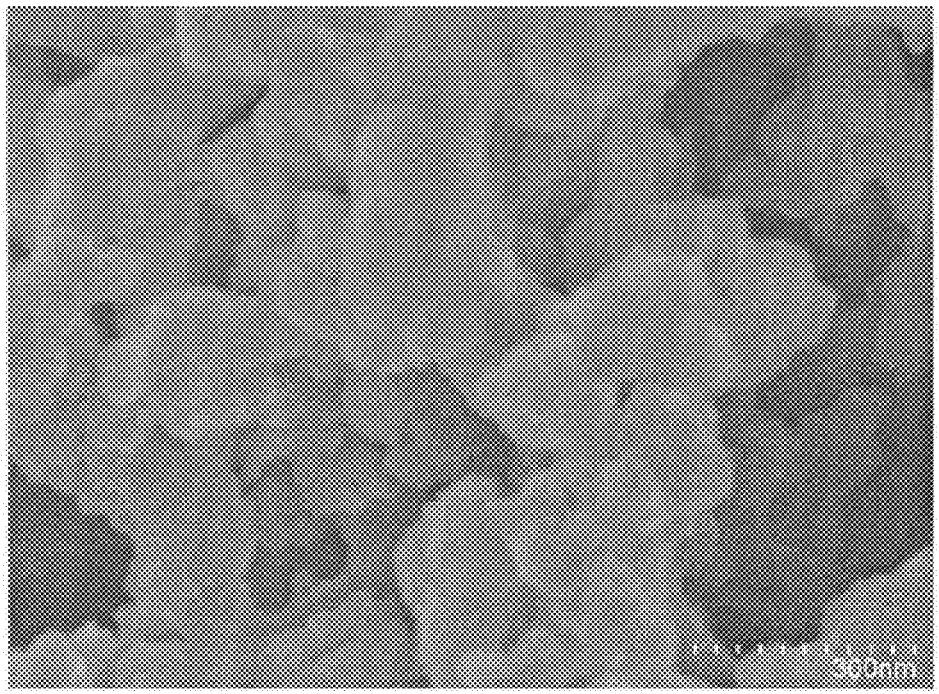
FIG. 11 illustrates an FE-SEM of titanium oxide nanoparticles prepared by a method according to one embodiment.
Figure 12:
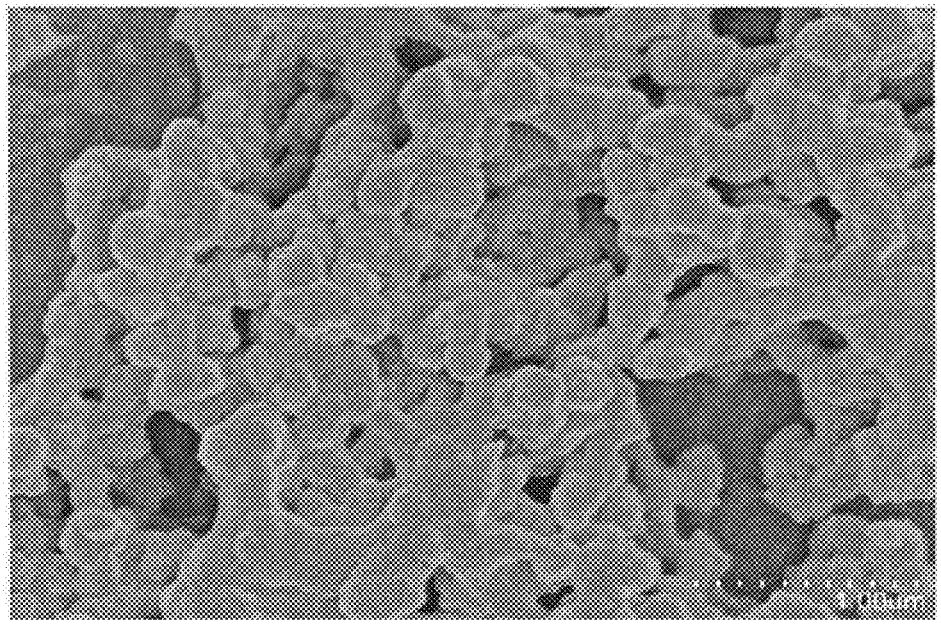
FIG. 12 illustrates another FE-SEM of titanium oxide nanoparticles prepared by a method according to one embodiment.

FIGS. 11-12 are FE-SEM photomicrographs of titanium oxide nanoparticles prepared according to one embodiment of the invention.

In one exemplary embodiment of the invention, a reactive titanium organometallic compound is dissolved in a non-polar solvent low boiling point to provide a solution that may include 0.1-2 weight percent of the organometallic compound. In one embodiment, nanoparticles were prepared from one weight percent titanium isopropoxide in n-hexane. Other solvents may include, but are not limited to, n-heptane, xylene, or ethyl acetate. The weight percent of the organic metallic compound included in the solution may range from 0.1-5, 0.1-2, 0.1-1 weight percent or ranges there between.

Referring again to FIG. 6, the following is a description of non-limiting exemplary embodiment of various fuel cell components on, in or through which the layer including nanoparticles including metal oxides may be deposited.

Microporous Layer

In one embodiment, the microporous layer may be made from materials such as carbon blacks and hydrophobic constituents such as polytetrafluoroethylene (PTFE) and polyvinylidene fluoride (PVDF), and may have a thickness ranging from about 2 to about 100 micrometers. In one embodiment the microporous layer may include a plurality of particles, for example including graphitized carbon, and a binder. In one embodiment the binder may include a hydrophobic polymer such as, but not limited to, polyvinylidene fluoride (PVDF), fluoroethylene propylene (FEP), polytetrafluoroethylene (PTFE), or other organic or inorganic hydrophobic materials. The particles and binder may be included in a liquid phase which may be, for example, a mixture of an organic solvent and water to provide dispersion. In various embodiments, the solvent may include at least one of 2-propanol, 1-propanol or ethanol, etc. The dispersion may be applied to a fuel cell substrate, such as, a gas diffusion media layer or a hydrophobic coating over the gas diffusion media layer. In another embodiment, the dispersion may be applied to an electrode. The dispersion may be dried (by evaporating the solvent) and the resulting dried microporous layer may include 60-90 weight percent particles and 10-40 weight percent binder. In various other embodiments, the binder may range from 10-30 weight percent of the dried microporous layer.

Gas Diffusion Media Layer

In one embodiment of the invention, the gas diffusion media layer may include any electrically conductive porous material. In various embodiments, the gas diffusion media layer may include non-woven carbon fiber paper or woven carbon cloth which may be treated with a hydrophobic material, such as, but not limited to, polymers of polyvinylidene fluoride (PVDF), fluroethylene propylene, or polytetrafluoroethylene (PTFE). The gas diffusion media layer may have an average pore size ranging from 5-40 micrometers. The gas diffusion media layer may have a thickness ranging from about 100 to about 500 micrometers.

Electrode Layers

In one embodiment, the electrodes (cathode layer and anode layer) may be catalyst layers which may include catalyst particles such as platinum, and an ion conductive material such as a proton conducting ionomer, intermingled with the particles. The proton conductive material may be an ionomer such as a perfluorinated sulfonic acid polymer. The catalyst materials may include metals such as platinum, palladium, and mixtures of metals such as platinum and molybdenum, platinum and cobalt, platinum and ruthenium, platinum and nickel, platinum and tin, other platinum transition-metal alloys, and other fuel cell electrocatalysts known in the art. The catalyst materials may be finely divided if desired. The catalyst materials may be unsupported or supported on a variety of materials such as but not limited to finely divided carbon particles.

Membrane

A variety of different types of membranes may be used in embodiments of the invention. The solid polymer electrolyte membrane useful in various embodiments of the invention may be an ion-conductive material. Examples of suitable membranes are disclosed in U.S. Pat. Nos. 4,272,353 and 3,134,689. Such membranes are also known as ion exchange resin membranes. The resins include ionic groups in their polymeric structure; one ionic component for which is fixed or retained by the polymeric matrix and at least one other ionic component being a mobile replaceable ion electrostatically associated with the fixed component. The ability of the mobile ion to be replaced under appropriate conditions with other ions imparts ion exchange characteristics to these materials.

The ion exchange resins can be prepared by polymerizing a mixture of ingredients, one of which contains an ionic constituent. One broad class of cationic exchange, proton conductive resins is the so-called sulfonic acid cationic exchange resin. In the sulfonic acid membranes, the cationic exchange groups are sulfonic acid groups which are attached to the polymer backbone.

The formation of these ion exchange resins into membranes or chutes is well-known to those skilled in the art. The preferred type is perfluorinated sulfonic acid polymer electrolyte in which the entire membrane structure has ionic exchange characteristics. These membranes are commercially available, and a typical example of a commercial sulfonic perfluorocarbon proton conductive membrane is sold by E. I. DuPont D Nemours & Company under the trade designation NAFION. Other such membranes are available from Asahi Glass and Asahi Chemical Company. The use of other types of membranes, such as, but not limited to, perfluorinated cation-exchange membranes, hydrocarbon based cation-exchange membranes as well as anion-exchange membranes are also within the scope of the invention.

Bipolar Plates

In one embodiment of the invention, the bipolar plates may include one or more layers of a metal for electrically conductive composite material. In one embodiment, the bipolar plates include stainless steel. The lands and channels may be formed in the bipolar plate by machining, etching, stamping, molding or the like. The lands and channels may define a reactant gas flow field to deliver a fuel on one side of the bipolar plate and an oxidant on the other side of the plate.

In one embodiment the nanoparticles, which may be in the form of rods may be used as catalyst support for electrodes. The electrochemical stability along with the high surface area of the nanoparticles that by far exceeds those of the currently used carbon blacks that are known to have stability issues such as carbon corrosion.

One embodiment may include depositing a solution comprising an organometallic compound on a substrate to provide a film of the organometallic compound and at least partially oxidizing an organic component of the organometallic compound to provide nanoparticles; coating a catalyst on the nanoparticles to provide catalyst coated nanoparticles; forming a fuel cell electrode using the catalyst coated nanoparticles. In another embodiment a solution including the catalyst coated nanoparticles may be deposited on one of a fuel cell membrane, fuel cell microporous layer, or fuel cell diffusion media layer. Alternatively the solution including the catalyst coated nanoparticles may be deposited on a decal and dried to form an electrode. The electrode may be applied to one of a fuel cell membrane, fuel cell microporous layer, or fuel cell diffusion media layer.

Another embodiment may include a process including making fuel cell membranes including adding an organometallic solution including an organometallic compound to a polyelectrolyte, such as Nafion, solution to provide a mixture and casting the mixture so that the metallic oxide particles, such as titanium oxide, are attached to the polyelectrolyte to produce a self humidification membrane. The organic component of the organometallic compound may be oxidized before or during the casting to provide metallic oxide particles attached to the polyelectrolyte polymer of the polyelectrolyte solution. The hydrophilicity of titania will tend to retain water in the membrane and thus reducing or eliminating the need for external humidification of the membrane.

The above description of embodiments of the invention is merely exemplary in nature and, thus, variations thereof are not to be regarded as a departure from the spirit and scope of the invention.

What is claimed is:

1. A process comprising:
adding an organometallic solution comprising metallic oxide particles to a polyelectrolyte solution to provide a mixture, and wherein the polyelectrolyte solution comprises a polyelectrolyte;
casting the mixture so that the metallic oxide particles are attached to the polyelectrolyte to produce a self humidifying membrane.

2. A process as set forth in claim 1 wherein the metallic oxide particles comprise titanium isopropoxide.

3. A process as set forth in claim 1 wherein the polyelectrolyte solution includes a solvent comprising n-hexane.

4. A process as set forth in claim 2 wherein the titanium isopropoxide is present in about 1 weight percent.

5. A process as set forth in claim 1 wherein the organometallic solution is present in about 0.1 to about 5 weight percent.

6. A process as set forth in claim 1 wherein the organometallic solution is present in about 0.1 to about 2 weight percent.

7. A process method as set forth in claim 1 wherein the organometallic solution is present in about 0.1 to about 1 weight percent.

8. A process as set forth in claim 1 wherein the organometallic solution is partially oxidized so that a plurality of said metallic oxide particles are linked together by organic struts.

9. A process comprising:
adding an organometallic solution comprising titanium isopropoxide particles to a polyelectrolyte solution comprising a solvent comprising n-hexane to provide a mixture;
casting the mixture so that the titanium isopropoxide particles are attached to the polyelectrolyte solution to produce a self-humidifying membrane.

10. A process comprising:
adding an organometallic solution comprising an organometallic compound to a polyelectrolyte solution to provide a mixture, and wherein the polyelectrolyte solution comprises a polyelectrolyte;
casting the mixture and oxidizing the organometallic compound during the casting to produce metallic oxide particles and so that the metallic oxide particles are attached to the polyelectrolyte to produce a self humidifying membrane.

* * * * *